(12) United States Patent
Nishina et al.

(10) Patent No.: US 6,553,685 B2
(45) Date of Patent: Apr. 29, 2003

(54) MEASURING INSTRUMENTS

(75) Inventors: Shingo Nishina, Kawasaki (JP); Masahiko Tachikake, Higashihiroshima (JP); Yoshiaki Shiraishi, Kawasaki (JP); Rie Tanaka, Kawasaki (JP); Shuuji Hayashida, Kawasaki (JP); Yoshitaka Kuji, Kawasaki (JP); Osamu Saito, Kawasaki (JP); Tetsuya Nakadoi, Higashihiroshima (JP)

(73) Assignee: Mitutoyo Corporation, Kawasaki (JP)

( * ) Notice: Subject to any disclaimer, the term of this patent is extended or adjusted under 35 U.S.C. 154(b) by 0 days.

(21) Appl. No.: 09/909,800

(22) Filed: Jul. 23, 2001

(65) Prior Publication Data

US 2002/0017032 A1 Feb. 14, 2002

(30) Foreign Application Priority Data

| Jul. 26, 2000 | (JP) | ......... 2000-225316 |
| May 10, 2001 | (JP) | ......... 2001-139923 |

(51) Int. Cl.$^7$ ................................................. G01B 3/18
(52) U.S. Cl. ........................ 33/815; 33/813; 33/830; 33/784
(58) Field of Search .................. 33/813–827, 830, 33/831, 783, 784, 792, 793, 794

(56) References Cited

U.S. PATENT DOCUMENTS

| 570,189 A | * | 10/1896 | Stromberg ................ 33/828 |
| 1,188,978 A | * | 6/1916 | Muller ..................... 33/821 |
| 1,656,927 A | * | 1/1928 | Wheelock .................. 33/825 |
| 2,611,967 A | * | 9/1952 | Bennett ..................... 33/825 |
| 2,835,040 A | * | 5/1958 | D'Elia ...................... 33/549 |
| 4,437,241 A | * | 3/1984 | Lemelson ................... 33/818 |
| 4,532,711 A | * | 8/1985 | Shirai ....................... 33/556 |
| 4,578,868 A | * | 4/1986 | Sasaki et al. .............. 33/706 |
| 5,287,631 A | * | 2/1994 | Stade ....................... 33/810 |
| 5,433,015 A | * | 7/1995 | Mazenet .................... 33/815 |
| 5,495,677 A | * | 3/1996 | Tachikake et al. .......... 33/784 |
| 6,247,244 B1 | * | 6/2001 | Zanier et al. .............. 33/784 |
| 6,260,286 B1 | * | 7/2001 | Suzuki et al. .............. 33/813 |
| 6,463,671 B1 | * | 10/2002 | Saeki ....................... 33/815 |
| 6,505,414 B2 | * | 1/2003 | Fujikawa ................... 33/813 |

FOREIGN PATENT DOCUMENTS

| JP | A 55-147301 | 11/1980 |
| JP | U 2-12602 | 1/1990 |
| JP | A 4-296601 | 10/1992 |
| JP | A 7-55608 | 3/1995 |
| JP | B1 2000-88503 | 3/2000 |

* cited by examiner

*Primary Examiner*—Diego Gutierrez
*Assistant Examiner*—Yaritza Guadalupe
(74) *Attorney, Agent, or Firm*—Oliff & Berridge, PLC

(57) ABSTRACT

A measuring instrument includes a spindle (11) provided to a body (1), a sleeve (31) movable in the same direction as the spindle and stoppable at a desired position, a connector (41) for connecting the sleeve and the spindle and allowing relative movement of the sleeve and the spindle in the moving direction thereof by a predetermined stroke; a pressure spring (61) accommodated in the sleeve for biasing the spindle in a direction for the spindle to abut to the workpiece through the connector, and a biasing force indicator (71) for indicating the pressure spring.

16 Claims, 16 Drawing Sheets

MEASURING INSTRUMENTS

BACKGROUND OF THE INVENTION

1. Field of the Invention

The present invention relates to a measuring instrument for bringing a spindle into contact with a workpiece to measure the dimension of the workpiece based on the moving position of the spindle. More specifically, it relates to a measuring instrument having a body and a spindle provided to the body movable in the axial direction of the body, in which the spindle is brought into contact with the workpiece by moving the spindle in the axial direction to measure the dimension of the workpiece, the measuring instrument being capable of displaying measuring force.

2. Description of Related Art

A measuring instrument having a spindle movably provided to a body to be in contact with a workpiece for detecting a dimension of the workpiece such as, for instance, a micrometer, also has a ratchet mechanism for bringing the spindle into contact with the workpiece at a constant force as well as a thimble for advancing and retracting the spindle in the axial direction thereof.

During measurement, after placing the workpiece between the anvil and the spindle, the thimble is rotated to move the spindle toward the workpiece, thereby sandwiching the workpiece by the anvil and the spindle. Subsequently, when hand is released from the thimble and a knob of the ratchet mechanism is rotated, the ratchet mechanism is freely rotated when more than a predetermined force is applied to the spindle, so that the measurement can be conducted at a constant measuring force.

In such a measuring instrument having the spindle to be in contact with the workpiece to measure the dimension of the workpiece, since the abutting force when the spindle is in contact with the spindle, i.e. the measuring force, exerts large influence on the measurement results, appropriate measuring force in accordance with the material and configuration of the workpiece is strongly desired.

However, though the constant measuring force can be maintained during measurement by the conventional measuring instrument, it is practically difficult to change the measuring force in accordance with the material and configuration of the workpiece.

SUMMARY OF THE INVENTION

An object of the present invention is to provide a measuring instrument capable of measuring a workpiece with the most suitable measuring force in accordance with the material and configuration of the workpiece.

In the present invention, a biaser and a biasing force indicator for checking the biasing force of the biaser are used to obtain the constant measuring force.

A measuring instrument according to the present invention includes: a body; a spindle provided to the body movably in an axial direction thereof, the spindle being moved in the axial direction to contact to a workpiece for measuring the dimension of the workpiece based on a moving position of the spindle; a sleeve provided to the body movable in the same direction as the moving direction of the spindle and stoppable at a desired position; a connector for connecting the sleeve and the spindle and allowing a relative movement of the sleeve and the spindle by a predetermined stroke in the moving direction; a biaser accommodated in the sleeve for biasing the spindle through the connector in a direction to abut to the workpiece; and a biasing force indicator for indicating a biasing force of the biaser.

According to the above-described measuring instrument, when the sleeve is moved in the axial direction of the spindle during measurement, the sleeve, the biaser, the connector and the spindle are moved in the same direction in a body. After the distal end of the spindle touches the workpiece, when the sleeve is further moved in the same direction, since the spindle cannot be moved, the biaser is gradually compressed. The force for the biaser to bias the spindle, in other words, the measuring force, is an addition of the force increasing in proportion to the compression to the preload, which is displayed on the biasing force indicator.

Accordingly, the measurement can be conducted under the most appropriate measuring force in accordance with material and configuration of the workpiece while checking the measuring force indicated by the biasing force indicator. In other words, when the material of the workpiece is soft, the workpiece can be measured with minute measuring force and a number of workpiece can be measured always under constant measuring force.

In the above, the sleeve may be manually moved, or may be driven by a release, lever, rack and pinion, motor, etc. However, the sleeve may preferably be driven by the below-described thimble.

The connector may have one end fixed to either one of the spindle and the sleeve and the other end being movably connected to the other one of the spindle and the sleeve by a predetermined stroke. Alternatively, both ends may be movably connected to the spindle and the sleeve by a predetermined stroke.

Any biaser capable of biasing the spindle in a direction to abut to the workpiece may be used. However, helical pressure spring may preferably be used.

In the present invention, a biasing force adjuster for adjusting the biasing force of the biaser may preferably be screwed to the sleeve.

According to the measuring instrument, when the screwing position of the biasing force adjuster screwed to the sleeve is changed, since the distance from the biasing force adjuster to the connector changes, the compression of the biaser accommodated therebetween changes. Accordingly, the preload can be changed with a simple arrangement.

In the present invention, the biasing force indicator may preferably include: a scale rod provided to the connector penetrating the biasing force adjuster; and a scale formed along a longitudinal direction of the scale rod at a predetermined interval.

According to the above measuring instrument, when the preload is changed by changing the screwing position of the biasing force adjuster relative to the sleeve, the distance from the connector to the biasing force adjuster (i.e. the compression of the biaser) changes. Then, since the projection of the scale rod from the biasing force adjuster changes, the compression of the biaser, i.e. the measuring force can be read by reading the scale formed on the scale rod. Accordingly, the preload can be adjusted while looking at the scale, or the measurement can be conducted under a desired measuring force.

In the present invention, the biasing force indicator may preferably include: a threaded shaft provided to the connector penetrating the biasing force adjuster and having an external thread on an outer circumference thereof; a nut screwed to the threaded shaft and provided to the sleeve rotatable and immovable in the axial direction; and an index fixed to the nut.

According to the above measuring instrument, after bringing the spindle into contact with the workpiece, when the sleeve is further rotated in the same direction, the connector and the sleeve (or the biasing force adjuster) are relatively displaced. Then, since the threaded shaft and the nut are relatively displaced in accordance with change in the compression of the biaser, the nut is rotated, i.e. the index is rotated. Accordingly, the compression of the biaser, i.e. the measuring force can be read by the rotary angle of the index, thereby conducting measurement under desired measuring force while observing the rotary angle of the index.

In the above, a graduation plate having an angle scale indicating a rotary angle of the index may be attached to the sleeve side for accurately reading the rotary angle of the index.

In the present invention, the biasing force indicator may preferably include: a detection switch for detecting that the spindle and the sleeve approach with each other by a predetermined distance; and a display for displaying an actuation of the detection switch.

According to the above measuring instrument, after the spindle is in contact with the workpiece during measurement, when the sleeve is further moved in the same direction, the spindle and the sleeve are relatively displaced. Then, the compression of the biaser changes. At this time, when the spindle and the sleeve approach with each other by a predetermined distance, the detection switch is actuated, which is displayed on the display. Accordingly, the attainment of a predetermined compression of the biaser, i.e. attainment of a predetermined measuring force, can be read by the indication on the display, so that the measurement can be conducted always at a constant measuring force.

In the above, the detection switch may include an electrode spring provided on either one of the spindle and the sleeve and an electrode provided to the other one of the spindle and the sleeve corresponding to the electrode plate spring.

In the present invention, a position detection indicator for detecting the moving position of the spindle as an electric signal and for digitally displaying the moving position of the spindle based on the detected result may preferably be provided, in which an indicated value of the position detection indicator is held when the detection switch is actuated.

According to the measuring instrument, the indicated value on the position detection indicator is automatically held when the compression of the biaser reaches a predetermined value, so that usability can be enhanced without requiring attention to the over-feed of the sleeve.

In the present invention, the biasing force indicator may preferably include: a force sensor provided between the connector and the biaser; and a measuring force indicator for displaying a magnitude of a force detected by the force sensor.

According to the above measuring instrument, since the force in accordance with the compression of the biaser is directly detected by the force sensor and is displayed on the measuring force indicator, the measuring force can be directly checked, so that the measurement under a desired measuring force can be more accurately conducted.

In the above, though the magnitude of the force displayed on the measuring force indicator may be indicated as a numeral, or alternatively as a bar graph. When the magnitude is displayed as a bar graph, the compressing process of the biaser can be visually checked, so that the sleeve can be easily stopped at a desired position.

In the present invention, the sleeve may preferably be provided to the body in a manner unrotatable and movable in the axial direction and may preferably be screwed to a thimble rotatably provided at a predetermined position of the body.

According to the above measuring instrument, when the thimble is rotated, the sleeve screwed thereto is movable in the axial direction and unrotatable relative to the body and thus is moved in the axial direction. Accordingly, by rotating the thimble, the sleeve can be minutely moved by a predetermined amount and can be stopped at any desired position.

In the present invention, an anvil opposing to the spindle for holding the workpiece against the spindle may preferably be provided to the body, and a holder for holding the workpiece against the anvil on both sides of the anvil sandwiching an axis line of the spindle may preferably be rotatably provided on the anvil side of the body.

According to the above measuring instrument, the workpiece can be held by the anvil and the holder and, under the condition, the spindle can be brought into contact with the workpiece for measurement. Accordingly, even a workpiece of small rigidity such as thin wire and of rolling shape such as a pin is to be measured, the workpiece can be stably held between the anvil and the holder, so that measuring operation can be easily and accurately conducted.

In the present invention, a preload indicator for indicating a preload of the biaser adjusted by screwing the biasing force adjuster may preferably be provided.

According to the measuring instrument, since the preload of the biaser is displayed by the preload indicator, the screwing position of the biasing force adjuster can be adjusted while checking the indication. Accordingly, the preload of the biaser can be accurately adjusted.

In the present invention, the preload indicator may preferably include a scale provided on the outer circumference of the biasing force adjuster along the axial direction.

According to the above measuring instrument, when the preload of the biaser is adjusted while adjusting the screwing position of the biasing force adjuster, since the position of the scale provided on the outer circumference of the biasing force adjuster along the axial direction relative to the sleeve, the preload of the biaser can be read by the scale. Accordingly, the preload indicator can be constructed with a relatively simple arrangement of providing scale along the axial direction on the outer circumference of the biasing force adjuster.

In the present invention, the preload indicator may preferably include: a display cylinder provided on an outer circumference of the biasing force adjuster in a manner capable of adjusting rotation and position thereof along the axial direction; and a scale provided on the outer circumference of the display cylinder along the axial direction.

According to the above arrangement, the standard scale of the display cylinder can coincide with a reference position by adjusting rotation or position in the axial position of the display cylinder having the scale relative to the outer circumference of the biasing force adjuster. Accordingly, even when there is dispersion in producing the biaser, the standard scale can be made consistent with the reference position without requiring special processing and adding new component.

In the present invention, a cover for covering the biasing force adjuster may preferably be detachably provided to the body.

According to the above measuring instrument, since the window since the window for exposing the scale is provided to the cover, the scale can be visually checked through the window. In other words, the scale can be visually checked while preventing fluctuation of the screwing position of the biasing force adjuster on account of contact to the biasing force adjuster.

In another aspect of the present invention, in order to obtain a constant measuring force, a measured value when a constant measuring force is obtained may be held.

A measuring instrument according to another aspect of the present invention includes: a body; a spindle provided to the body movably in an axial direction thereof, the spindle being moved in the axial direction to contact to a workpiece for measuring the dimension of the workpiece based on a moving position of the spindle; a digital display for digitally displaying the moving position of the spindle; a measuring force detector for detecting a measuring force for the spindle to press the workpiece; and an indication holder for holding a value indicated on the digital display when the measuring force detected by the measuring force detector reaches a predetermined value.

According to the above measuring instrument, after bringing the spindle into contact with the workpiece while moving in the axial direction, when the spindle is further pressed, the measuring force for the spindle to press the workpiece is detected by the measuring force detector. When the detected measuring force reaches a predetermined measuring force, the indicated value on the digital display is held. Accordingly, the measurement can be conducted under the most appropriate measuring force in accordance with material and shape of the workpiece.

In the above aspect of the present invention, the measuring force detector may preferably include: an index rotatably provided to the body; a movement converting mechanism for converting a measuring force for the spindle to press the workpiece into a rotary motion of the index; and a detection switch for detecting a predetermined amount of displacement of a part of the movement converting mechanism or the index to transmit a hold command to the indication holder.

According to the above measuring instrument, the measuring force for the spindle to press the workpiece is converted to the rotation of the index by the movement converting mechanism to be displayed. When the part of the movement converting mechanism or the index displaces for a predetermined amount, the indication holder holds the indicated value by the command from the detection switch, so that the measurement can be conducted under the most appropriate measuring force in accordance with material and shape of the workpiece.

DETAILED DESCRIPTION OF PREFERRED EMBODIMENT(S)

Figure 1:
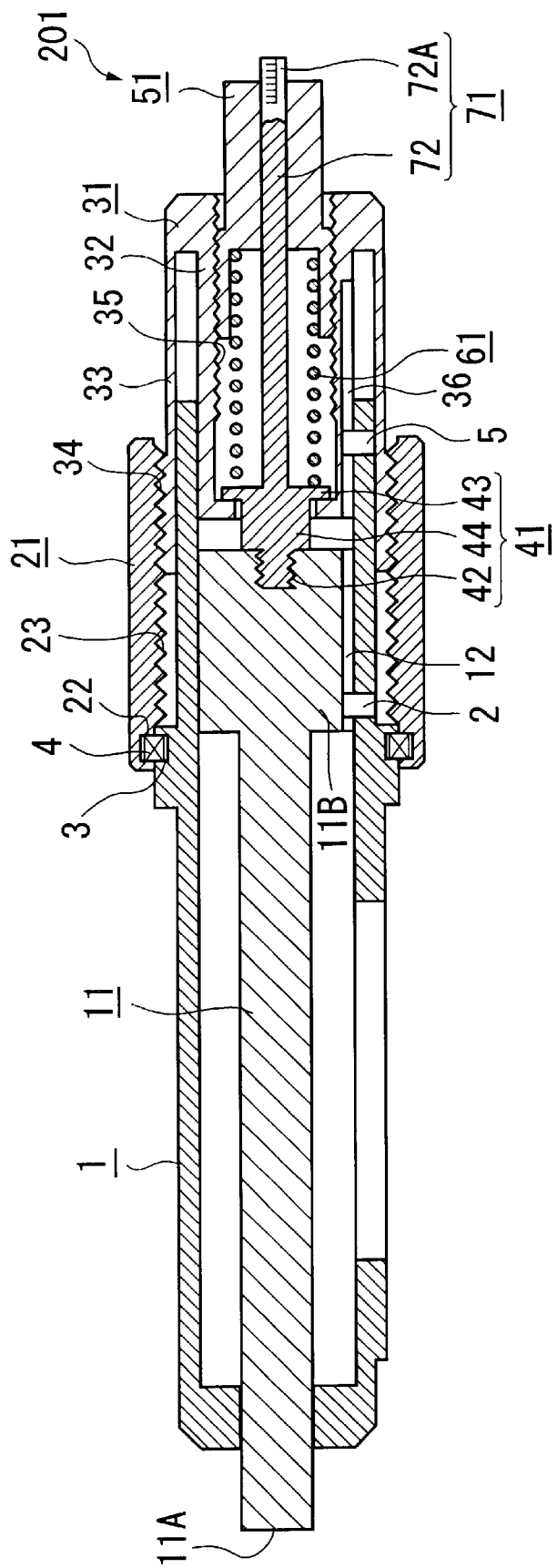
FIG. 1 is a cross section showing a first embodiment of the present invention.

Embodiments of the preset invention will be described below with reference to attached drawings. Incidentally, the same reference numeral will be attached to the same components to omit or simplify description thereof.

[First Embodiment]

FIG. 1 shows a first embodiment. The measuring instrument of the first embodiment has a cylindrical body 1, a spindle 11 provided inside the body 1, a thimble 21 provided outside the body 1, a sleeve 31 movable in the same direction as the moving direction of the spindle 11 and stoppable at any position, a connector 41 for connecting the sleeve 31 with the spindle 11, a biasing force adjuster 51, a pressure spring 61 as a biasing means, a biasing force indicator 71 and a position detecting indicator (not shown).

The spindle 11 is provided inside the body 1 to be movable in the axial direction and has a distal portion 11A projecting from the body 1. A key groove 12 slidably fitted to a key pin 2 projecting on the inner circumference of the body 1 is formed on a base end 11B of the spindle 11 along the axial direction. Accordingly, the spindle 11 is held by the body 1 while being movable in the axial direction and unable to rotate. Incidentally, reverse arrangement of the key pin 2 and the key groove 12 is possible in order to obtain the same advantages.

The thimble 21 is formed in a cylindrical shape having greater diameter than the outer diameter of the body 1 and has an end rotatably held at a predetermined position on the outer circumference of the body 1. In other words, the end of the thimble 21 is rotatably held at the predetermined position on the outer circumference of the body 1 by key grooves 3 and 22 respectively formed on the body 1 and the thimble 21 along corresponding circumference thereof and a key ring 4 fitted thereto. Incidentally, the key groove may be formed only on either one of the body 1 and the thimble 21 and the key pin or a key screw may be provided on the other. An internal thread 23 is formed on the inner circumference of the thimble 21.

The sleeve 31 is formed in a double-cylindrical structure having inner and outer cylinders connected on one end thereof. The inner cylinder 32 is accommodated inside the body 1 to be movable in the axial direction. The outer cylinder 33 is inserted into a gap between the body 1 and the thimble 21 and has an external thread 34 to be screwed to the internal thread 23 of the thimble 21 on the outer circumference thereof. An external thread 35 for the biasing force adjuster 51 to be screwed is formed on the inner circumference of the inner cylinder 32 and a key groove 36 to be slidably fitted to a key pin 5 projecting on the inner circumference of the body 1 is formed on the outer circumference along the axial direction thereof. Accordingly, the sleeve 31 is held by the body 1 while being movable in the axial direction and unable to rotate. Incidentally, reverse arrangement of the key pin 5 and the key groove 36 is possible in order to obtain the same advantages.

The connector 41 connects the sleeve 31 and the spindle 11 and allows their relative movement in the moving direction thereof at a predetermined stroke. Specifically, the connector 41 has a screw 42 screwed to the base end surface of the spindle 11, a fringe 43 in contact with an inside of rimmed portion of the inner end opening of the sleeve 31, and an intermediate portion 44 connecting therewith. Accordingly, the sleeve 31 and the spindle 11 can be relatively moved in the moving direction at a predetermined stroke.

The pressure spring 61 is formed by a helical spring and is accommodated between the biasing force adjuster 51 and the connector 41 for biasing the spindle 11 through the connector 41 in a direction for the spindle 11 to be in contact with the workpiece.

The biasing force indicator 71 has a scale rod 72 provided to the connector 41 penetrating a center hole of the biasing force adjuster 51 and a scale 72A formed along the longitudinal direction of the scale rod 72 with a predetermined interval. The biasing force indicator 71 composed of the scale rod 72 and the scale 72A also works as a preload indicator 201 for displaying preload of the pressure spring 61 as the biasing means adjusted by screwing the biasing force adjuster 51.

Next, a measuring method of the present embodiment will be described below.

In initiating measurement, when the thimble 21 is rotated while holding the body 1, the sleeve 31, the pressure spring 61, the connector 41 and the spindle 11 are moved in a body toward the axial direction thereof (leftward in FIG. 1). When the thimble 21 is further rotated after the distal portion 11A of the spindle 11 touches the workpiece, since the spindle 11 cannot be further moved, the pressure spring 61 is gradually compressed. The force for the pressure spring 61 to bias the spindle 11, in other words, the measuring force is an addition of the force increasing in proportion to the compression to the preload. Accordingly, the measuring force stays constant at a position with a constant compression of the pressure spring 61. Incidentally, the preload can be changed by rotating the biasing adjuster 51 to change the position thereof relative to the sleeve 31, which can be checked by the preload indicator 201.

The compression of the pressure spring 61 is the same as relative shift between the connector 41 and the biasing force adjuster 51, which can be read by the projection of the scale rod 72 of the biasing force indicator from the biasing force adjuster 51. In other words, the measuring force can be known by reading the scale 72A of the scale rod 72 coincident with the end surface of the biasing force adjuster 51. Accordingly, the measurement can be conducted under a desired measuring force by stopping the rotation of the thimble 21 when the scale 72A of the scale rod 72 coincident on the end surface of the biasing force adjuster 51 becomes a predetermined value, and reading the moving position of the spindle 11 by the position detecting indicator (not shown).

According to the first embodiment, following advantages can be obtained.

Since the compression of the pressure spring 61, i.e. the measuring force is indicated on the biasing force indicator 71, the measurement can be conducted under the most appropriate measuring force in accordance with material and configuration of the workpiece while checking the measuring force indicated by the biasing force indicator 71. In other words, when the material of the workpiece is soft, the workpiece can be measured with minute measuring force and a number of workpiece can be measured always under constant measuring force.

Since the biasing force adjuster 51 is screwed to the sleeve 31 accommodating the pressure spring 61 thereinside, the distance from the biasing force adjuster 51 to the connector 41 can be changed by rotating the biasing force adjuster 51. Accordingly, the compression of the pressure spring 61 accommodated therebetween can be changed. In other words, the preload can be changed with a simple arrangement. Further, the preload can be checked by the preload indicator 201.

Especially, since the biasing force indicator 71 has the scale rod 72 projecting on the connector 41 penetrating the biasing force adjuster 51 and the scale 72A formed on the scale rod 72 along the longitudinal direction at a predetermined interval, when the preload is changed by changing the screwing position of the biasing force adjuster 51 relative to the sleeve 31 or when, after the spindle 11 is in contact with the workpiece, the sleeve 31 is further moved in the same direction, since the projection of the scale rod 72 from the biasing force adjuster 51 changes, the compression of the pressure spring 61, i.e. the measuring force, can be read by reading the scale 72A formed on the scale rod 72. Accordingly, the preload can be adjusted while observing the scale 72A or the measurement can be conducted under a desired measuring force.

Since the thimble 21 is rotatably provided at a predetermined position of the body 1 and the sleeve 31 is screwed to the thimble 21, the sleeve 31 can be minutely moved for a predetermined distance by rotating the thimble 21 can be stopped at a desired position. Accordingly, since the measurement can be conducted while minutely adjusting the measuring force, highly accurate measurement can be expected.

[Second Embodiment]

Figure 2:
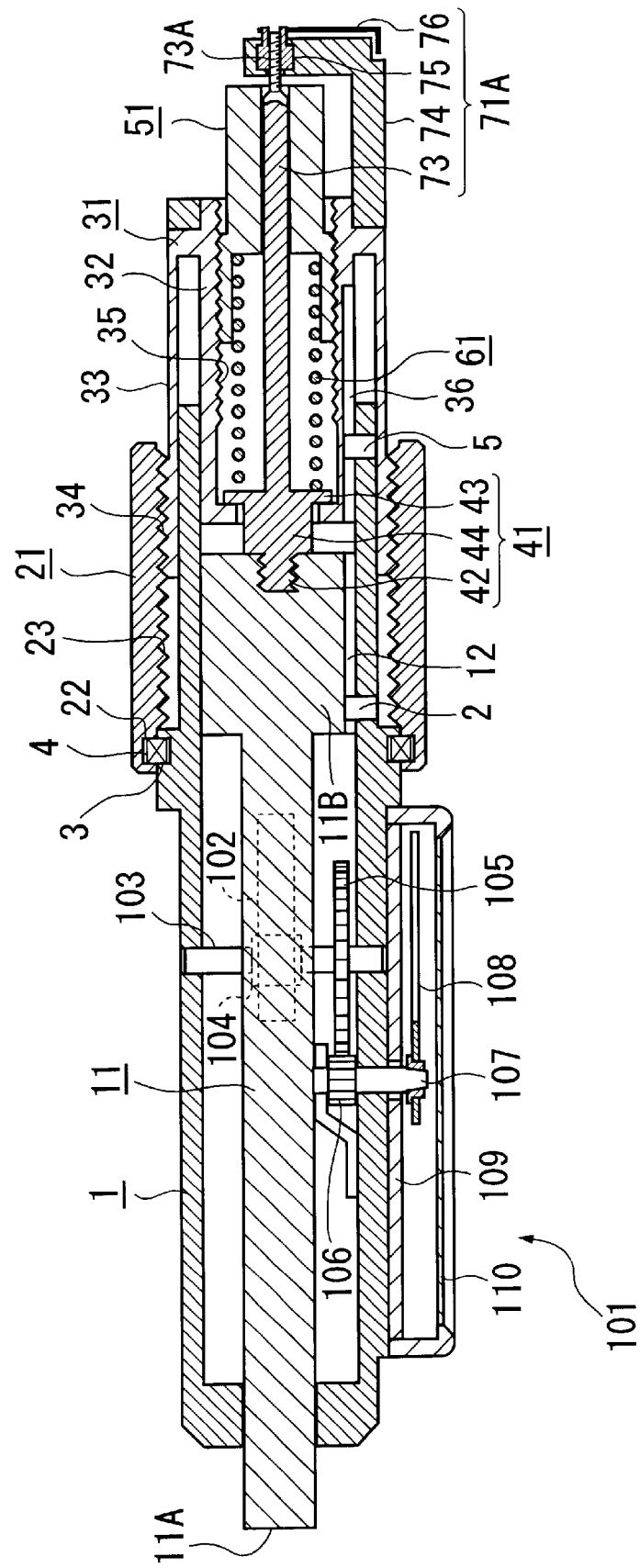
FIG. 2 is a cross section showing a second embodiment of the present invention.

FIG. 2 shows a second embodiment. The measuring instrument according to the second embodiment has a biasing force indicator arranged differently from the measuring instrument of the first embodiment and additionally has a position detecting indicator 101 for detecting the moving position of the spindle 11 as a rotary angle of an index.

A biasing force indicator 71A of the present embodiment has a threaded shaft 73 projected from the connector 41 penetrating the biasing force adjuster 51 and having an external thread 73A, a nut 75 screwed to the threaded shaft 73 and provided to an arm 74 in a manner rotatable and immovable in the axial direction thereof, and an index 76 fixed to the nut 75.

The position detecting indicator 101 has a rack 102 formed along the axial direction of the spindle 11, a pinion 104 meshed with the rack 102 and rotatably supported by the body 1 through a shaft 103, a gear 105 fixed to the shaft 103 of the pinion 104, a gear 106 meshing with the gear 105, an index shaft 107 having the gear 106 and rotatably supported by the body 1, an index attached to the index shaft 107, a graduation plate 109 for indicating rotary angle of the index 108, and a transparent case 110 covering the graduation plate 109 and the index 108.

Therefore, according to the second embodiment, after bringing the spindle 11 into contact with the workpiece, when the thimble 21 is further rotated to move the sleeve 31 in the same direction, the connector 41 and the sleeve 31 are relatively displaced. Then, since the threaded shaft 73 and the nut 75 are relatively displaced, the nut 75 is rotated to rotate the index 76. Accordingly, the relative displacement of the connector 41 and the sleeve 31 can be read by the rotary angle of the index 76, so that the position of the spindle 11 can be read by the index 108 of the position detecting indicator 101 and the graduation plate 109 when the rotary angle reaches a desired angle, thereby conducting measurement under desired measuring force.

Incidentally, the position detecting indicator may be a position detecting indicator for detecting and digitally displaying the moving position of the spindle 11 as an electric signal. The arm 74 may be provided with a graduation plate having an angle scale indicating the rotary angle of the index 76, thus accurately reading the rotary angle of the index 76.

[Third Embodiment]

Figure 3:
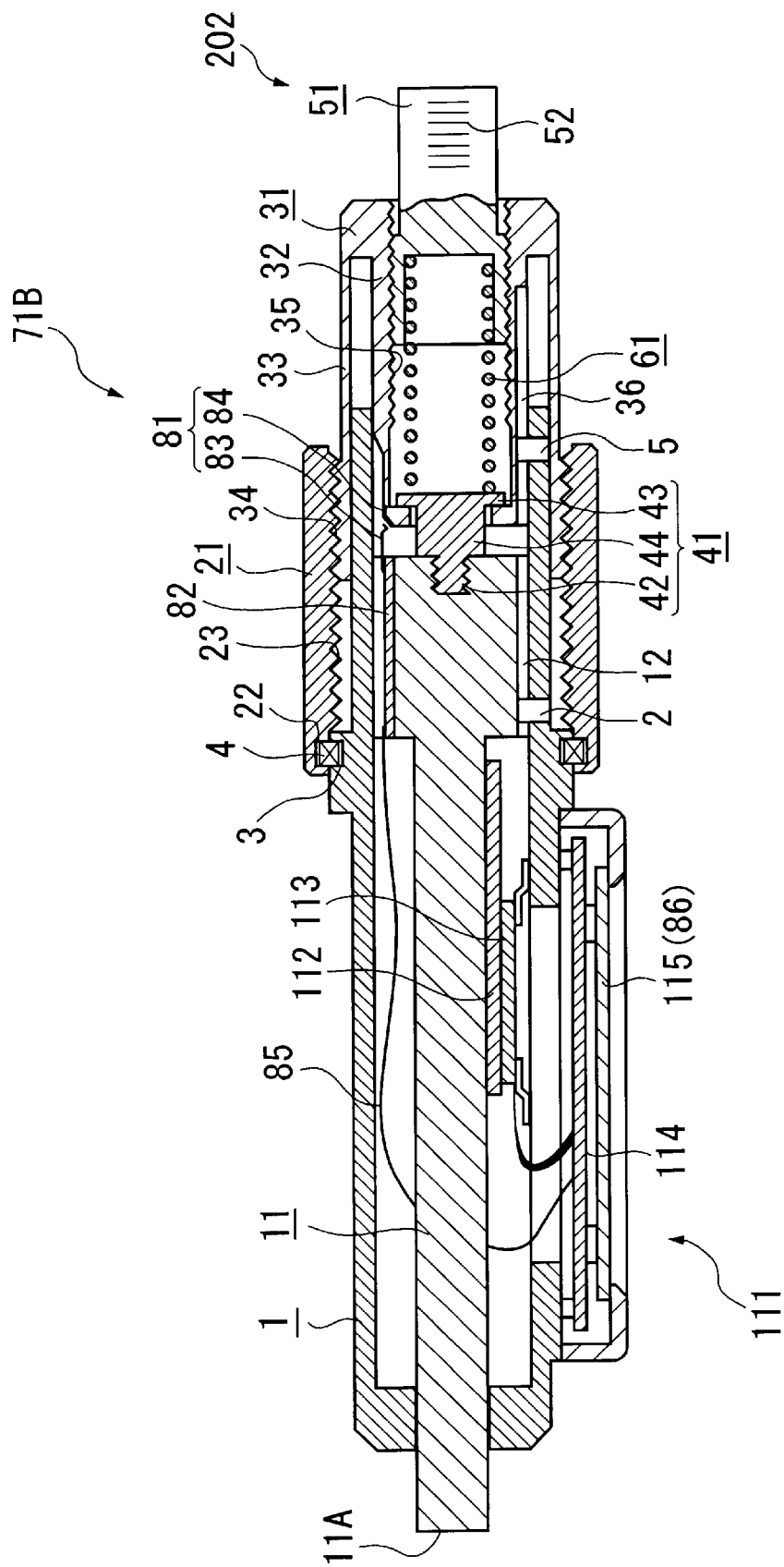
FIG. 3 is a cross section showing a third embodiment of the present invention.

FIG. 3 shows a third embodiment. The measuring instrument according to the third embodiment has a biasing force indicator arranged differently from the measuring instrument of the first embodiment and additionally has a position detecting indicator 111 for detecting the moving position of the spindle 11 as an electric signal.

The position detecting indicator 11 has a scale 112 provided to the spindle 11, a detection scale 113 opposingly provided to the body 1 spaced from the scale 112 with a predetermined gap, a detecting circuit 114 for detecting relative displacement of the scales 112 and 113 as an electric signal, and a digital display 115 for digitally displaying the relative displacement detected by the detecting circuit 114.

A biasing force indicator 71B includes a detection switch 81 for detecting approach of the spindle 11 and the sleeve 31 for a predetermined distance, and a display 86 (arranged as a part of the digital display 115) for displaying the actuation of the detection switch 81.

The detection switch 81 includes an electrode plate spring 83 provided to either one of the spindle 11 and the sleeve 31 (to the spindle 11 here) through an insulator 82, and an electrode 84 provided to the other (the sleeve 31, here) corresponding to the electrode plate spring 83. The signal from the detection switch 81 is inputted to the detecting circuit 114 through a wiring 85, attainment of a predetermined measuring force is displayed on the display 86 and the indicated value of the digital display 115 is automatically held.

Therefore, according to the third embodiment, after bringing the spindle 11 into contact with the workpiece during measurement, when the thimble 21 is continuously rotated to move the sleeve 31 in the same direction, the spindle 11 and the sleeve 31 are relatively moved. Then, the compression of the pressure spring 61 is changed. When the spindle 11 and the sleeve 31 approach with each other by a predetermined distance, the detection switch 81 is actuated, which is displayed on the display 86. Accordingly, attainment of a predetermined compression of the pressure spring 61, in other words, attainment of a predetermined measuring force can be read out by the indication of the display 86, so that the measurement can be conducted at a constant measuring force. Further, since the compression of the pressure spring 61 reaches the predetermined value, the indication of the digital display 115 is automatically held, so that usability can be enhanced without requiring attention to the over-feed of the sleeve 31. Incidentally, a scale 52 is formed on the outer circumference of the biasing force adjuster in the axial direction, so that the preload by the pressure spring 61 can be checked. In other words, the scale 52 formed on the outer circumference of the biasing force adjuster 51 in the axial direction constitutes a preload indicator 202. Accordingly, the preload indicator 202 can be constructed with a relatively simple arrangement with the scale 52 formed on the outer circumference of the biasing force adjuster 51 along the axial direction thereof.

[Fourth Embodiment]

Figure 4:
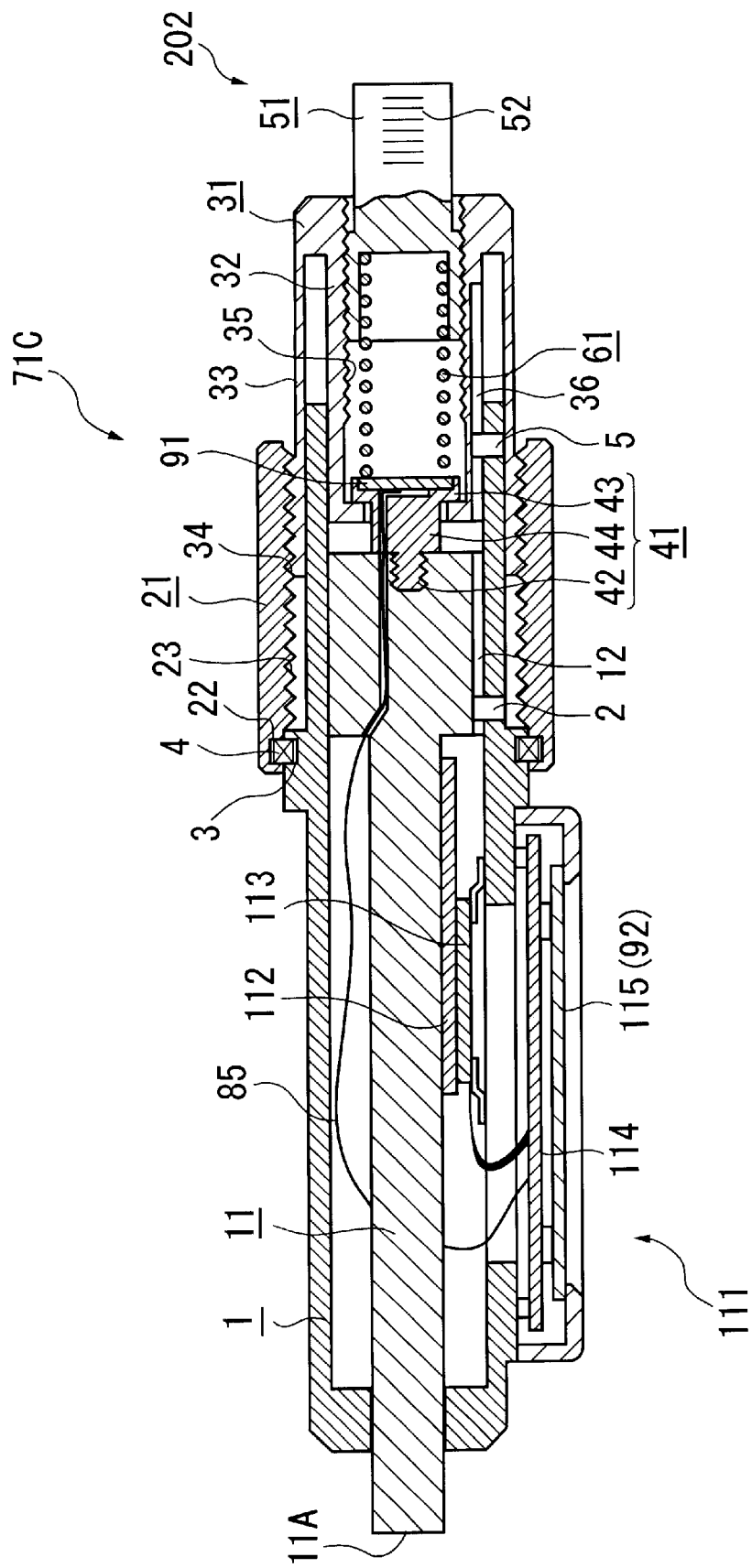
FIG. 4 is a cross section showing a fourth embodiment of the present invention.

FIG. 4 shows a fourth embodiment. The measuring instrument according to the fourth embodiment has a biasing force indicator arranged differently from the measuring instrument according to the third embodiment.

The biasing force indicator 71C according to the present embodiment includes a force sensor 91 provided between the connector 41 and the pressure spring 61, and a display 92 connected to the force sensor 91 through a wiring 85 for displaying a magnitude of a force detected by the force sensor 91. Piezoelectric element and load cell are used as the force sensor 91. The display 92 is formed on a part of the digital display 115 for displaying the amount of the force as a bar graph, which may be displayed as a numeral.

Accordingly, since the force accompanying the compression of the pressure spring 61 is directly detected by the force sensor 91 to be displayed on the display 92 in the fourth embodiment, the measuring force can be directly checked, so that measurement under a desired measuring force can be more accurately conducted.

Further, since the magnitude of the force displayed on the display 92 is displayed as the bar graph, the process for compressing the pressure spring 61 can be visually checked, so that the sleeve 31 can be stopped at a desired position.

[Fifth Embodiment]

Figure 5:
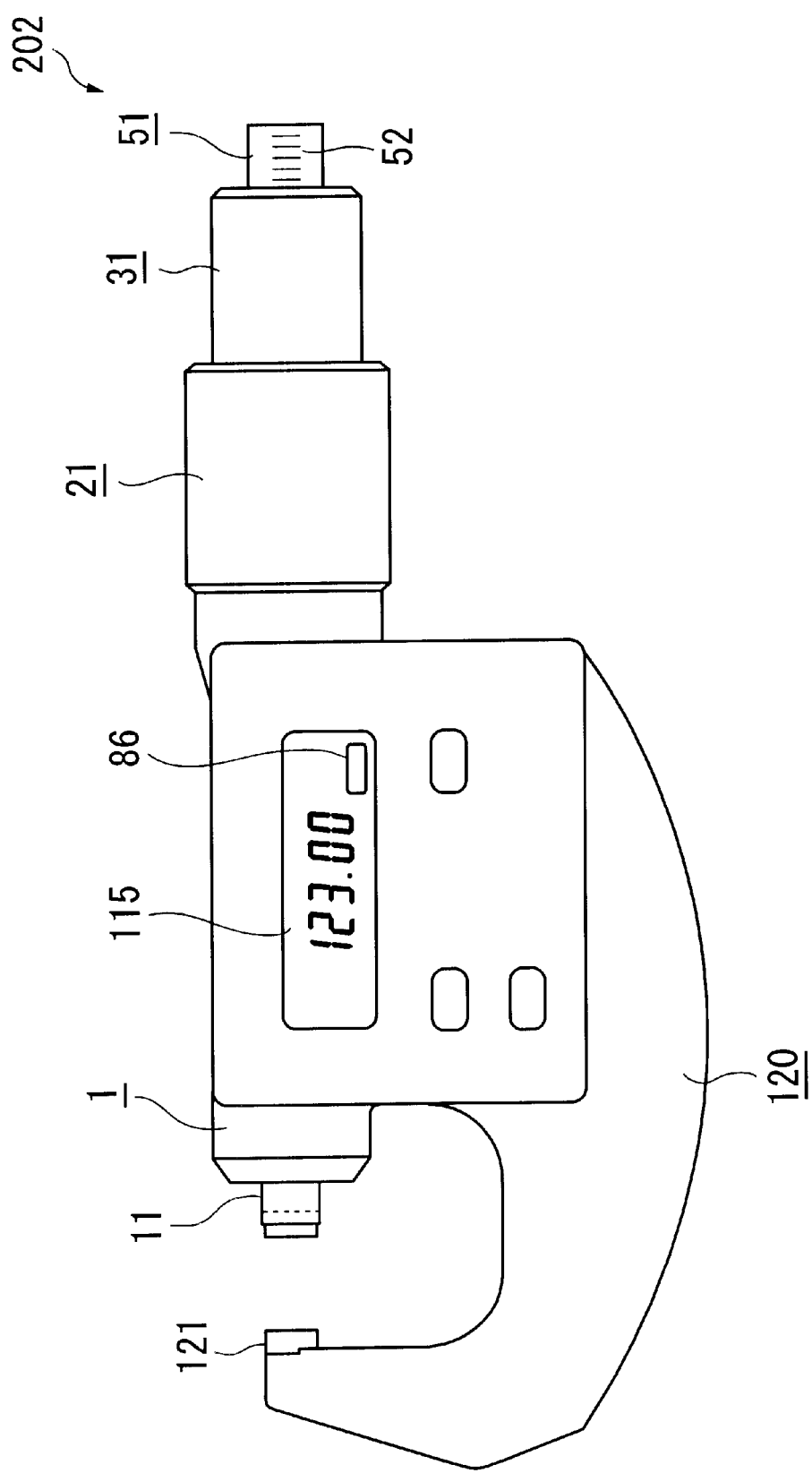
FIG. 5 is a front elevation showing a fifth embodiment of the present invention.

FIG. 5 shows a fifth embodiment. The measuring instrument according to the fifth embodiment has an arrangement of the third embodiment additionally having an end of the body 1 extended in L-shape and an anvil 121 for holding the workpiece between the spindle 11 attached to an inner end of the distal portion, i.e. the arrangement as a micrometer.

Therefore, according to the fifth embodiment, after the workpiece is held between the spindle 11 and the anvil 121, the dimension of the workpiece can be measured under a desired measuring force by reading an indicated value on the digital display 115 by stopping the rotation of the thimble 21 when the thimble 21 is further rotated and the display 86 of the biasing force indicator 71C indicates a predetermined value.

Incidentally, the arrangement of the micrometer as in the present embodiment can not only be applied to the measuring instrument of the third embodiment but also applied to the measuring instrument of the first, the second and the fourth embodiment.

[Sixth Embodiment]

Figure 6:
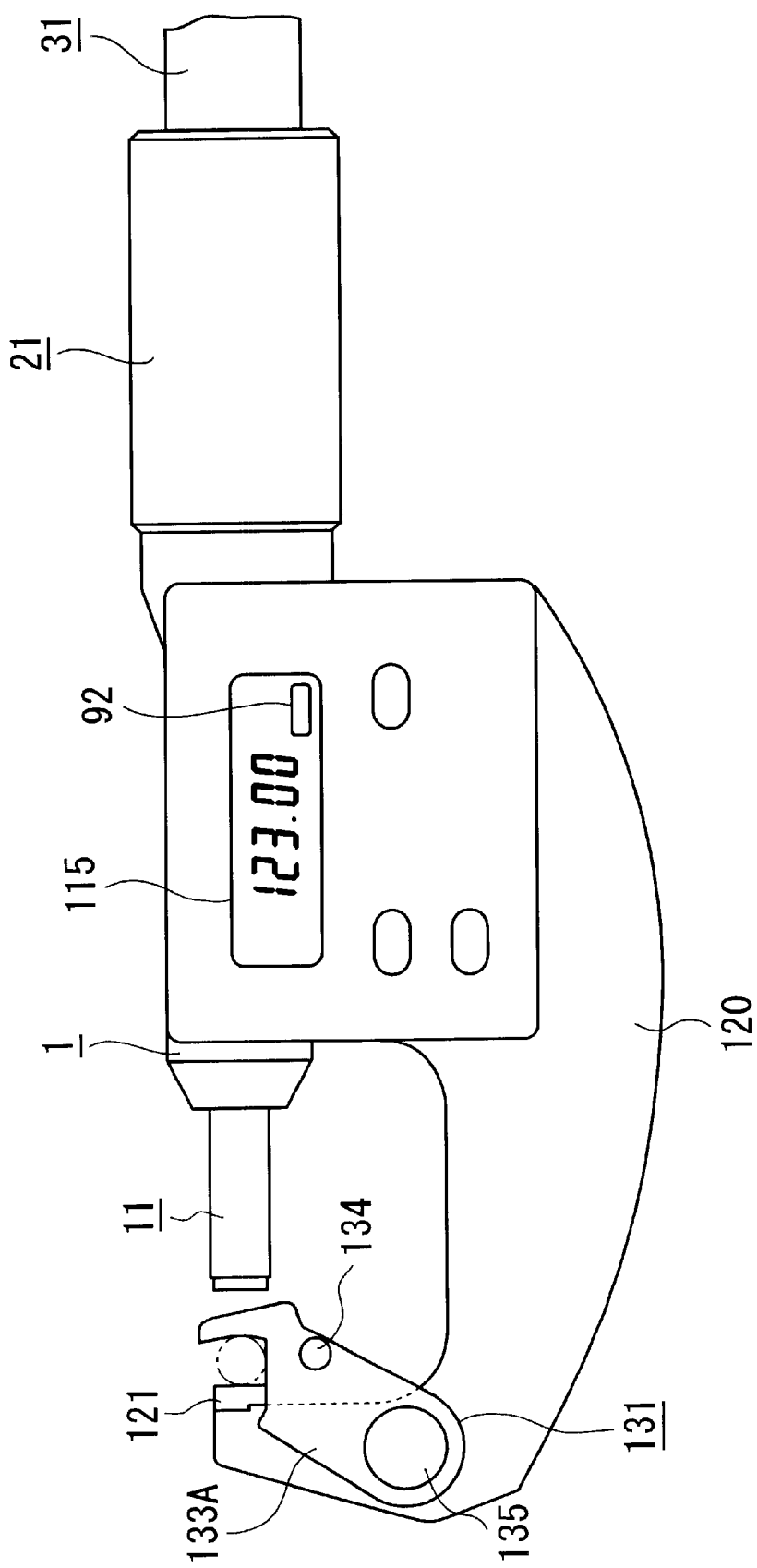
FIG. 6 is a front elevation showing a sixth embodiment of the present invention.

FIG. 6 shows a sixth embodiment. The measuring instrument according to the sixth embodiment has a retainer 131 for holding the workpiece onto the anvil 121 attached to the micrometer 120 of the fifth embodiment.

Figure 7:
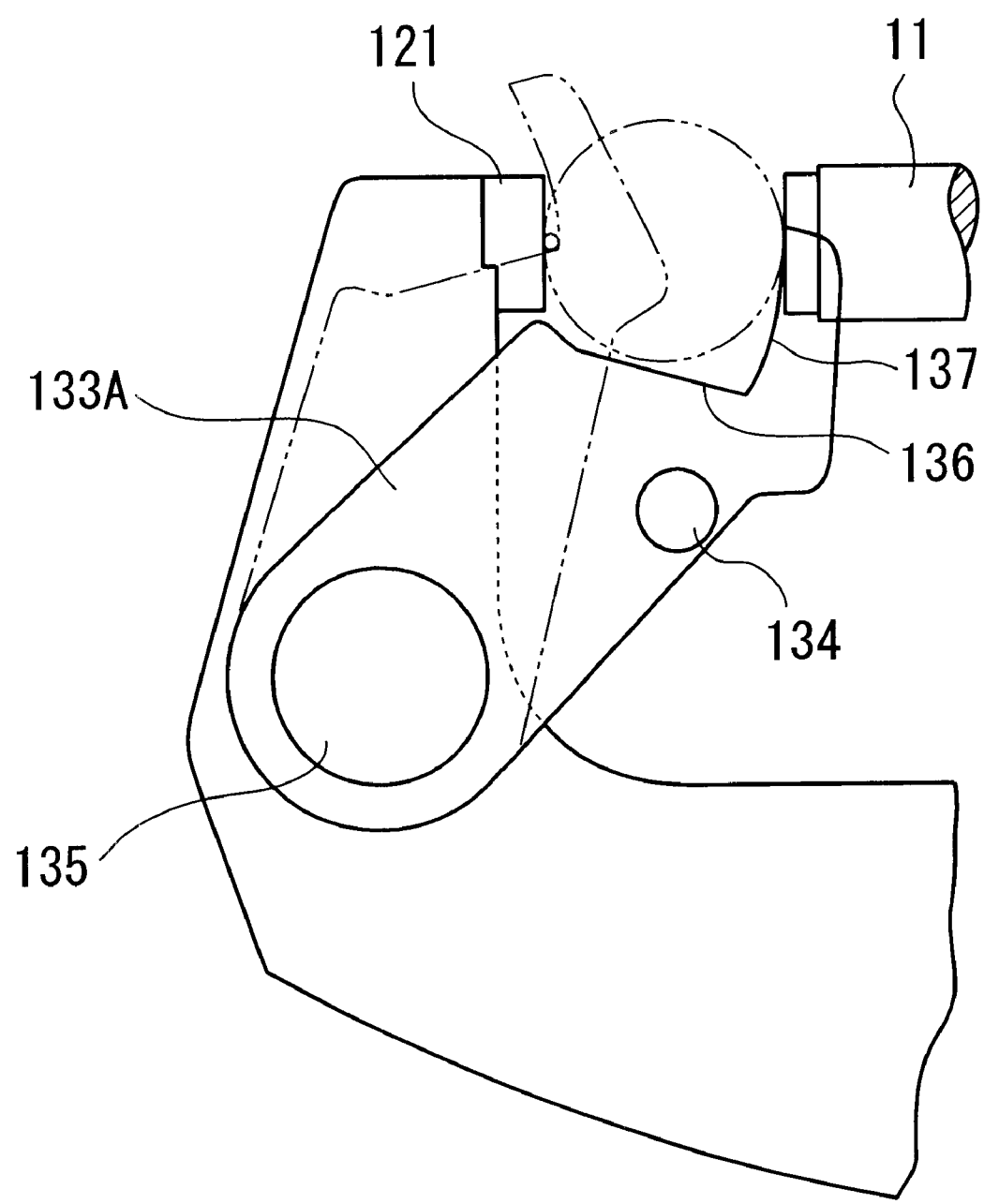
FIG. 7 is an enlarged front elevation showing a primary portion of the aforesaid embodiment.
Figure 8:
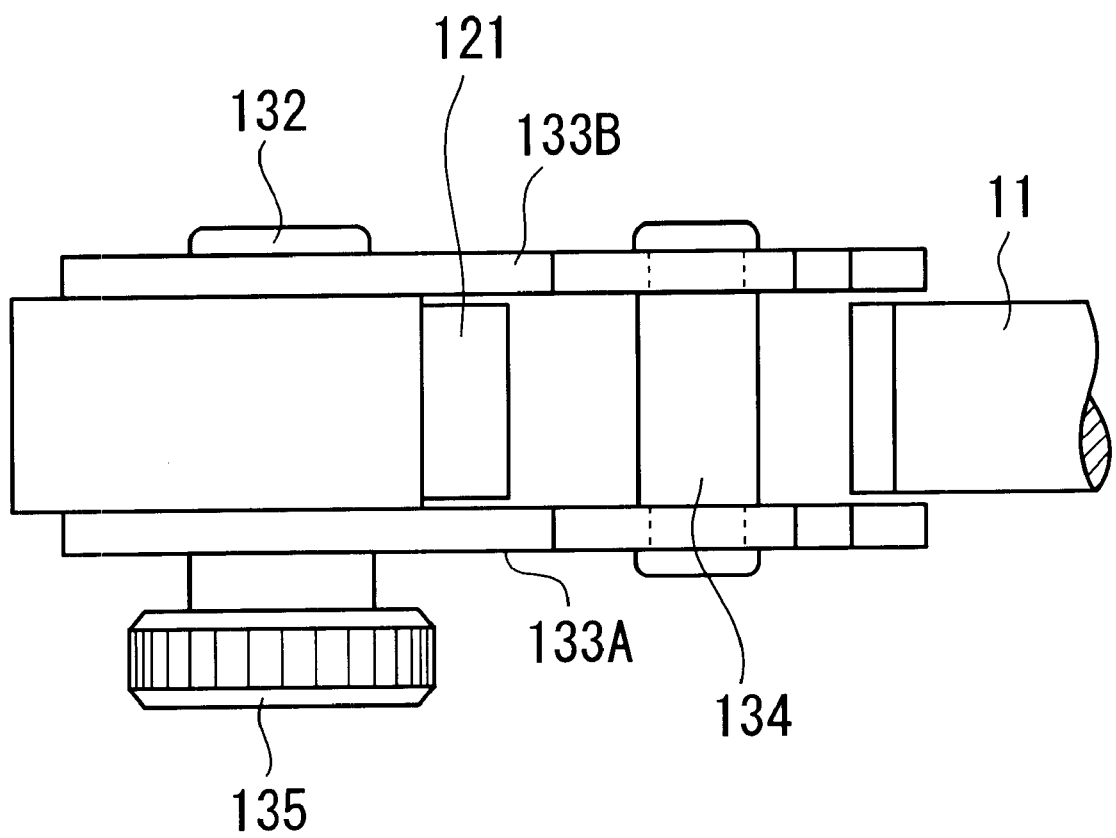
FIG. 8 is an enlarged plan view showing a primary portion of the aforesaid embodiment.
Figure 9:
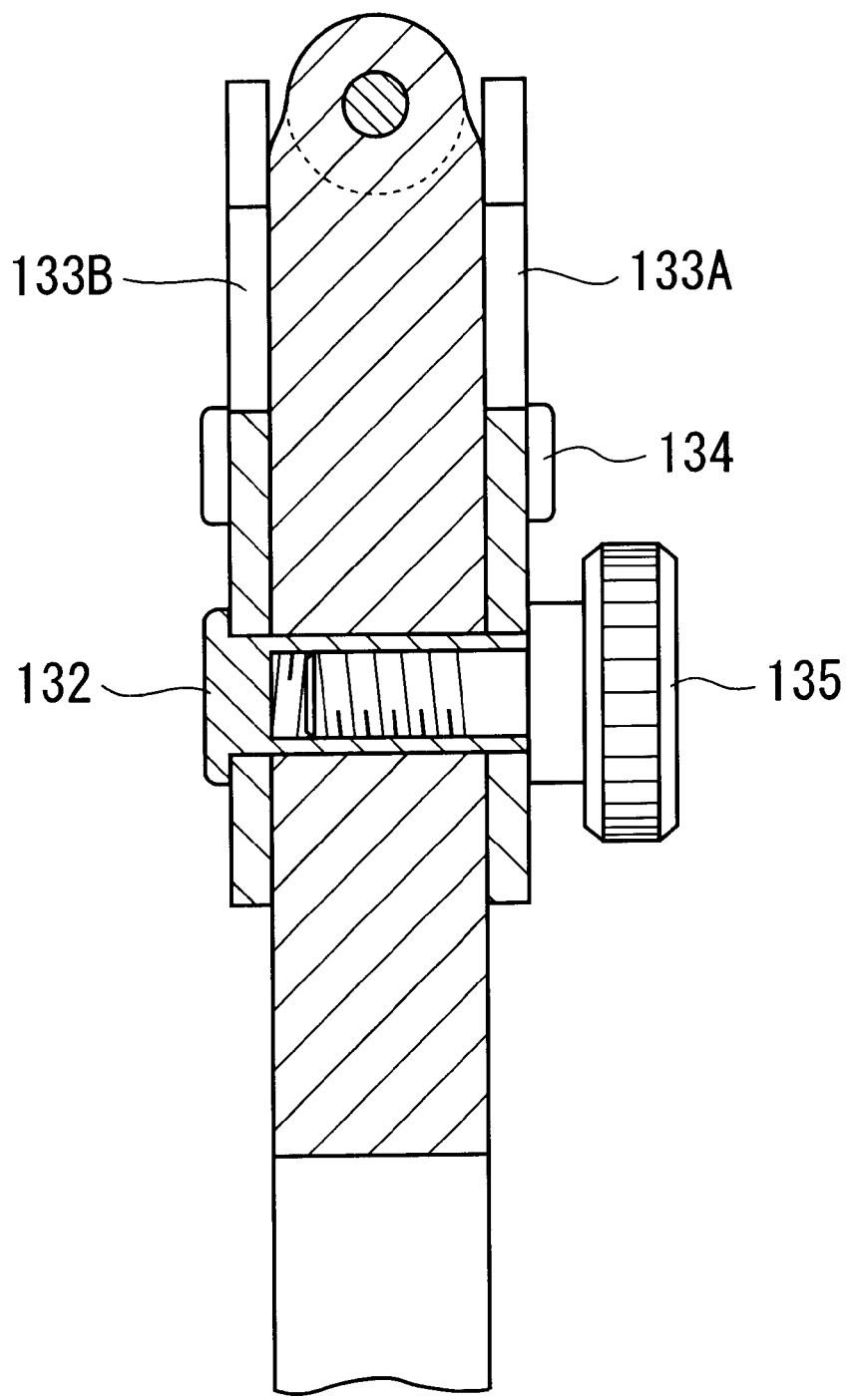
FIG. 9 is an enlarged cross section showing a primary portion of the aforesaid embodiment.

As shown in detail in FIGS. 7 to 9, the retainer 131 has a support shaft 132 penetrating the body adjacent to the anvil 121, a pair of clamp pieces 133A and 133B attached on both ends of the support shaft 132 sandwiching the body 1, a connecting pin 134, and a clamp screw 135 screwed to the support shaft 132 for clamping and fixing the pair of clamp pieces 133A and 133B at a desired rotary position.

The distal portions of the clamp pieces 133A and 133B are cut in a shape having a support surface 136 for supporting lower surface of the workpiece and a holding surface 137 approximately orthogonal with the support surface 136 for holding the workpiece against the anvil 121 in holding the workpiece. Specifically, as shown in FIG. 7, the shape of the support surface 136 and the holding surface 137 is defined so that, even when the diameter of the workpiece differs, the central axis of the workpiece is crossed and orthogonal with an axis line connecting the spindle 11 and the anvil 121.

Therefore, according to the sixth embodiment, the workpiece can be measured while being retained between the anvil 121 and the distal portions of the clamp pieces 133A and 133B in an attitude where the central axis of the workpiece crosses and is orthogonal with the axis line connecting the spindle 11 and the anvil 121. Accordingly, even a workpiece of small rigidity such as thin wire and of rolling shape such as a pin is to be measured, the workpiece can be stably held between the anvil 121 and the distal portions of the clamp pieces 133A and 133B, so that measuring operation can be easily and accurately conducted.

[Seventh Embodiment]

Figure 10:
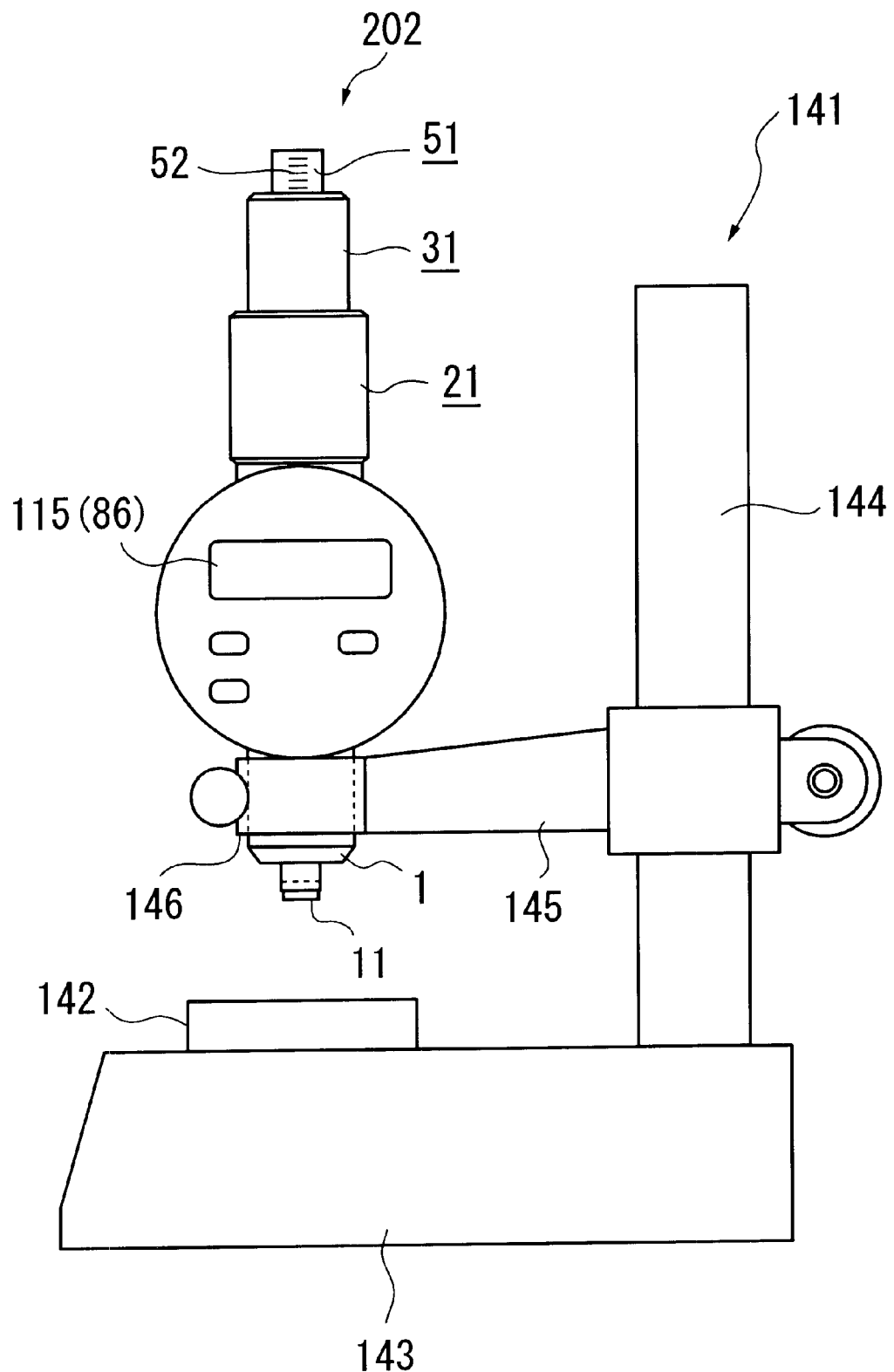
FIG. 10 is a front elevation showing a seventh embodiment of the present invention.

FIG. 10 shows a seventh embodiment. The measuring instrument according to the seventh embodiment is an example of a measuring apparatus having the measuring instrument according to the third embodiment and a stand 141 for holding the measuring instrument.

The stand 141 has a base 143 having a measuring table 142, a column standing on the base 143, an elevating arm 145 being vertically movable and stoppable on the column 144, and a clamp mechanism 146 provided on the distal end of the elevating arm 145 for holding the body 1 of the measuring instrument.

Therefore, according to the seventh embodiment, after the measuring instrument is held by the stand 141, the workpiece is mounted on the measuring table 142. Then, the thimble 21 is rotated to move the spindle 11 downwardly to be in contact with the workpiece. The thimble 21 is further rotated and the rotation is stopped when the display 86 of the biasing force indicator indicates the predetermined value. The, the displayed value of the digital display 115 is read, thereby measuring the dimension of the workpiece under a desired measuring force.

Incidentally, the arrangement using the support by the stand 141 as in the present embodiment can not only be applied to the measuring instrument of the third embodiment, but also can be applied to the measuring instrument of the first, second and fourth embodiments.

[Eighth Embodiment]

Figure 11:
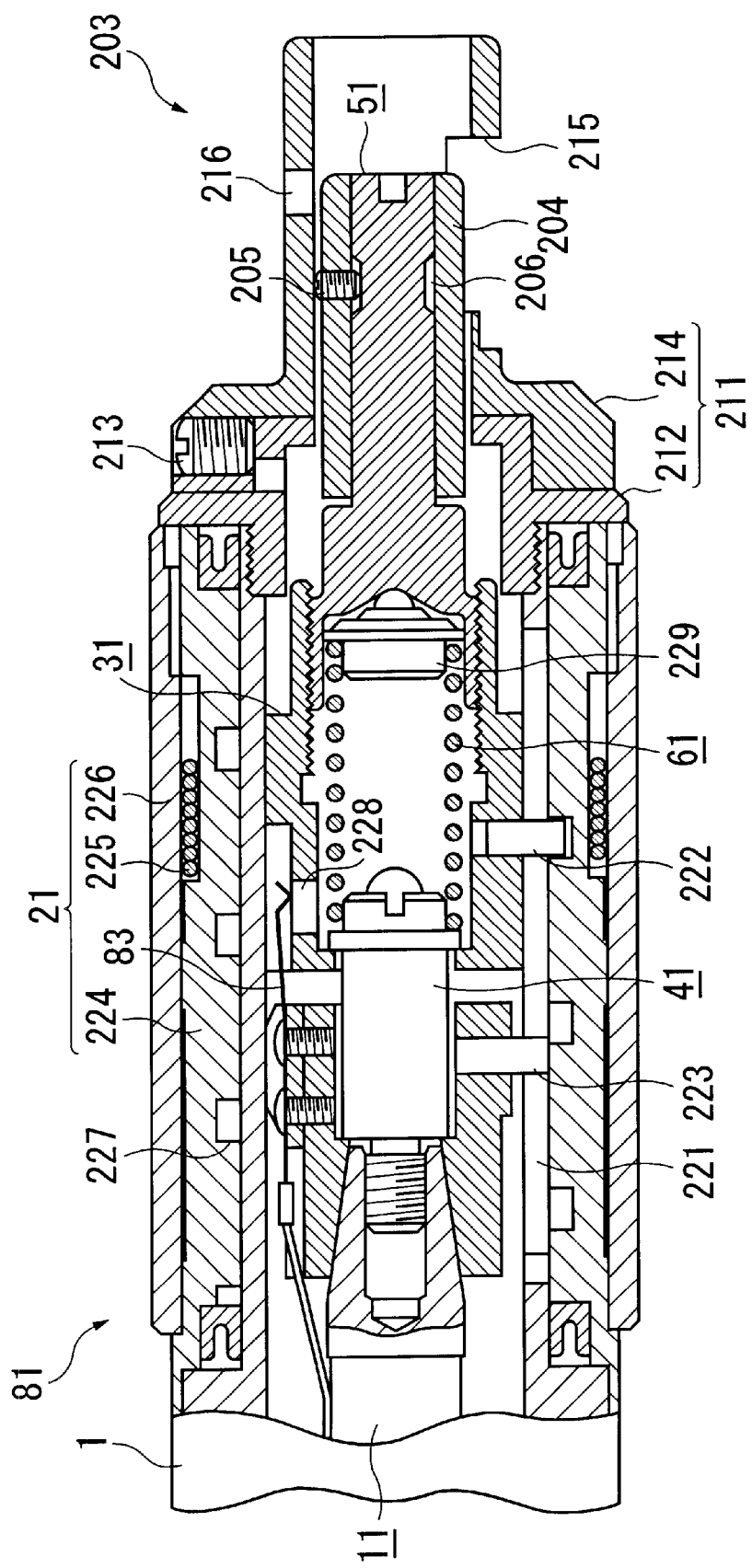
FIG. 11 is a cross section showing an eighth embodiment of the present invention.
Figure 12:
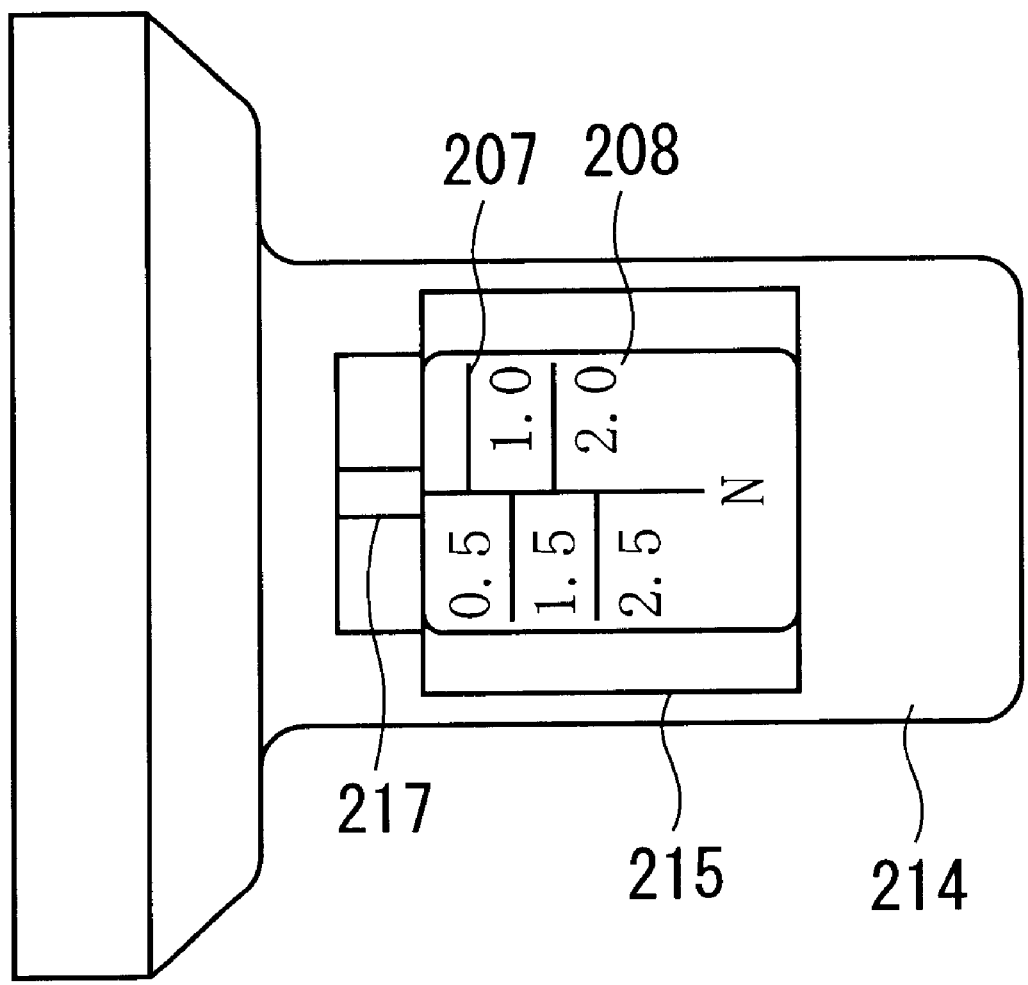
FIG. 12 is a front elevation showing a preload indicator of the aforesaid embodiment.

FIGS. 11 and 12 show an eighth embodiment. The measuring instrument according to the eighth embodiment has a preload indicator different from the measuring instrument of the third embodiment (the measuring instrument shown in FIG. 3) and a cover covering the biasing force adjuster 51 being detachably provided to the body.

A preload indicator 203 according to the present embodiment 203 has a display cylinder 204 provided on the outer circumference of the biasing force adjuster 51 in a manner capable of adjusting rotation and position in the axial direction thereof. Specifically, a setscrew 205 is screwed to the display cylinder 204 and the setscrew 205 projects into and abuts to a circular groove 206 formed in the middle of the biasing force adjuster 51. Accordingly, by changing the position of the setscrew 205, the display cylinder 204 is capable of adjusting rotation and position thereof in the axial direction on the outer circumference of the biasing force adjuster 51.

A scale 207 and numerals 208 for indicating measuring force are provided on the outer circumference of the display cylinder 204.

A cover 211 according to the present embodiment includes a thimble fixing member 212 screwed to the rear end of the body 1, and a cylindrical cover 214 rotatable and fixable by a setscrew 213 on the thimble fixing member 212. A window 215 for exposing the scale 207 and numerals 208 and a hole 216 for adjusting the setscrew 205 are respectively provided to the cover 214. An adjustment target indicating mark 217 is provided near the window 215.

Incidentally, the measuring instrument of the present embodiment has different drive mechanism for moving the sleeve 31 in the axial direction. In the present embodiment, a key groove 221 is formed in the axial direction of the body 1, and key pins 222 and 223 slidably moving in the key groove 221 project toward the sleeve 221 and the connector 41. The thimble 21 according to the present embodiment has an inner cylinder 224 rotatable on the outer circumference of the body 1, and an external cylinder 226 rotatably provided on the outer circumference of the inner cylinder 224 through a helical spring 225. A spiral spring 227 is formed on the inner circumference of the inner cylinder 224 and the key pin 222 is slidably engaged to the spiral groove 227. Accordingly, when the external cylinder 226 is rotated, the rotation is transmitted to the inner cylinder 224 through the helical spring 225, so that the sleeve 31 moves along the axial direction thereof by virtue of the key pin 222 and the key groove 221.

In the present embodiment, the electrode plate spring 83 is in contact with an insulation piece 228 provided to the sleeve 31. The electrode plate spring 83 is out of contact with the insulation piece 228 when the measuring force reaches a predetermined value, in other words, when the pressure spring 61 is compressed by a predetermined amount, and touches the sleeve 31 composed of a conductive material to output a hold command.

A spring receiver 229 for receiving an end of the pressure spring 61 is provided inside the biasing force adjuster 51. The spring receiver 229 has a flange for receiving the pressure spring 61 and a spherical portion touching an inner bottom of the biasing force adjuster 51 with a sphere.

Therefore, according to the eighth embodiment, by adjusting rotation and position in the axial direction of the display cylinder 204 having the scale 207 relative to the outer circumference of the biasing force adjuster 51, the standard scale 207 of the display cylinder 204 can coincide with a reference position. Accordingly, even when there is dispersion in producing the pressure spring 61, the standard scale 207 can be made consistent with the reference position without requiring special processing and adding new component.

Since the biasing force adjuster 51 is covered with the cover 211, fluctuation of the screwing position of the biasing force adjuster 51 on account of contact with the biasing force adjuster 51 can be prevented, thereby avoiding dispersion of the measuring force in advance. Further, since the window 215 for exposing the scale 207 is provided to the cover 211, the scale 207 can be visually checked through the window 215. In other words, the scale 207 can be visually checked while preventing fluctuation of the screwing position of the biasing force adjuster 51 on account of contact to the biasing force adjuster 51.

Further, since the spring receiver 229 for receiving the end of the pressure spring 61 is provided inside the biasing force adjuster 51, extension and contraction of the pressure spring 61 while being twisted in rotary direction can be prevented by the spherical portion in contact with the inner bottom end of the biasing force adjuster 51 by the sphere thereof to achieve linear extension and contraction thereof.

[Ninth Embodiment]

Figure 13:
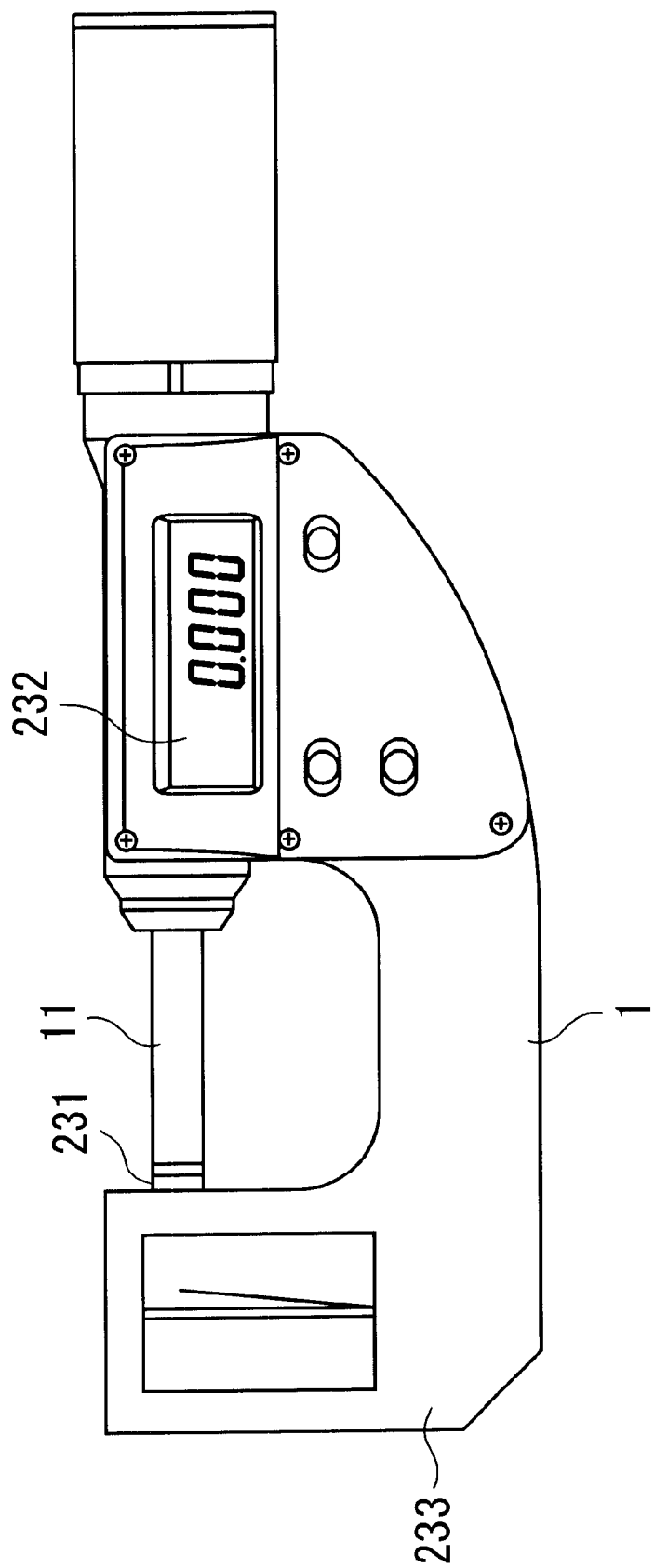
FIG. 13 is a front elevation showing a ninth embodiment of the present invention.
Figure 14:
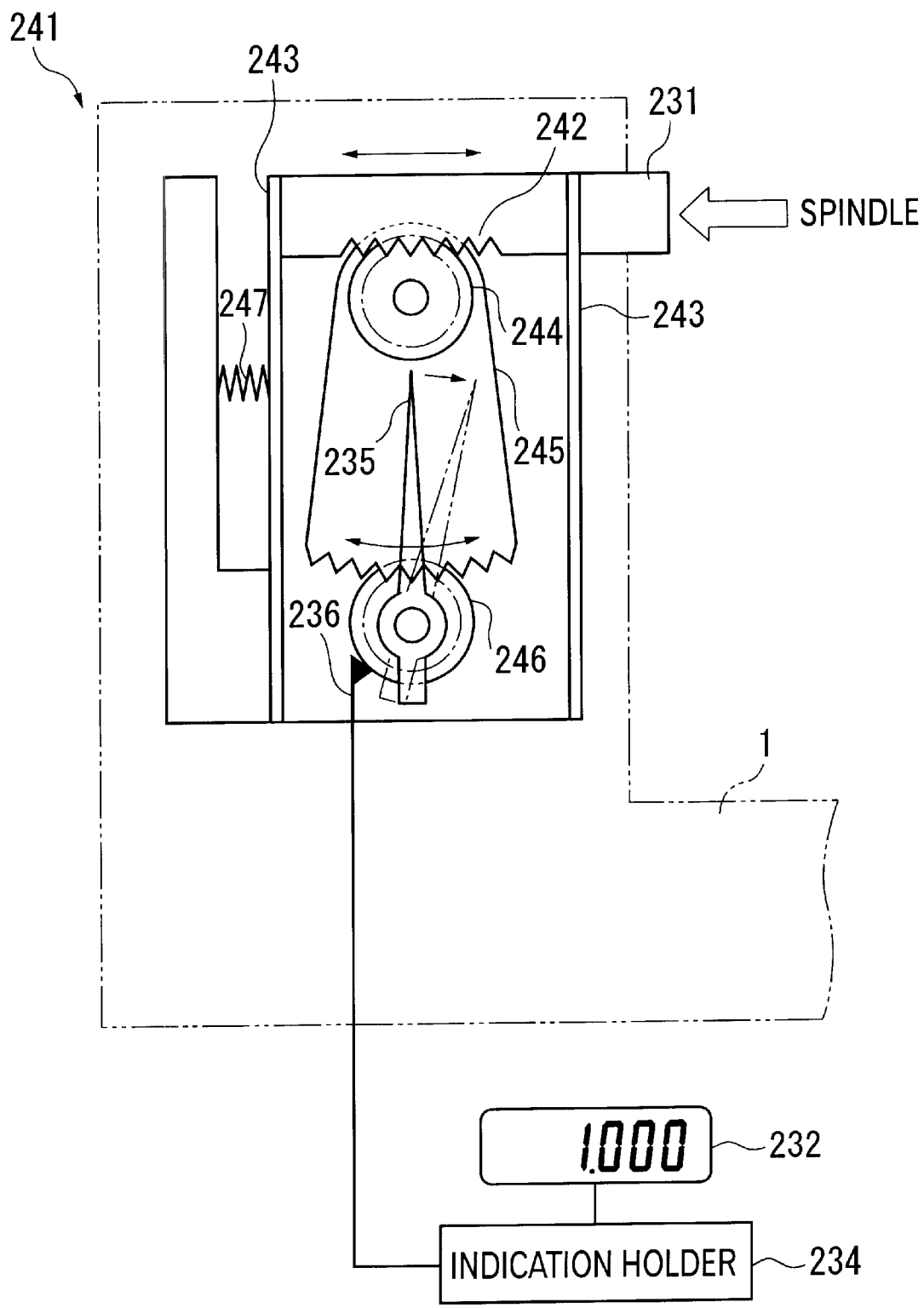
FIG. 14 is an illustration showing measuring force detector of the aforesaid embodiment.

FIGS. 13 and 14 show a ninth embodiment. The measuring instrument (micrometer) according to the ninth embodiment has a body 1, an anvil 231 provided to an end of the body 1, a spindle 11 provided to the other end of the body 1 movable toward the anvil 231 and displaceable toward the axial direction, a digital display 232 for digitally displaying the moving position of the spindle 11, a measuring force detector 233 for detecting the measuring force for the spindle 11 to press the workpiece and an indication holder 234 for holding the indicated value on the digital display 232 when the measuring force detected by the measuring force detector 233 reaches a predetermined measuring force.

The measuring force detector 233 includes an index 235 rotatably provided to the body 1, a movement converting mechanism 241 for converting the measuring force for the spindle 11 to press the workpiece into a rotary movement of the index 235, and a detection switch 236 for detecting the displacement of a part of the movement converting mechanism 241 or the index 235 to transmit a hold command to the indication holder 234.

The movement converting mechanism 241 includes parallel plate springs 243 having base ends fixed to the body 1 and a rack member 242 between distal ends thereof, a gear 244 meshed with the rack of the rack member 242 and rotatably supported by the body 1, a sector gear 245 fixed coaxially with the gear 244 and a gear 246 meshed with the sector gear 245, rotatably fixed to the body 1 and having the index 235 in a coaxial manner. Incidentally, the anvil 231 is linearly fixed to the rack member 242 on one of the parallel plate springs 243. A measuring force spring 247 is interposed between the other one of the parallel plate springs 243 and the body 1. The detection switch 236 is composed of a contact switch closed when the index 235 rotates for a predetermined amount.

Therefore, according to the ninth embodiment, when the spindle 11 is further pressed after bringing the spindle into contact with the workpiece while moving in the axial direction, the measuring force for the spindle 11 to press the workpiece is converted to the rotation of the index 235 by the movement converting mechanism 241. When the index 235 rotates for a predetermined rotation amount, the indicated value on the digital display is held by the command from the detection switch 136. Accordingly, the measurement can be conducted under the most appropriate measuring force in accordance with material and shape of the workpiece.

Figure 15:
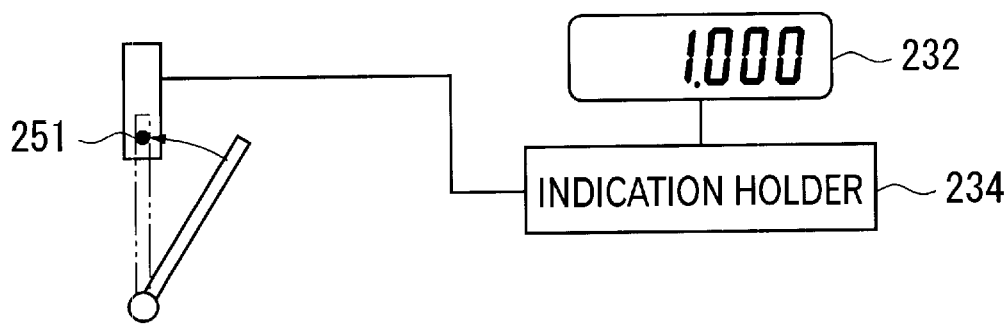
FIG. 15 is an illustration showing a modification of the ninth embodiment.

Incidentally, though the rotation of the index 235 for a predetermined amount is detected by the contact switch 236, as shown in FIG. 15, the predetermined rotation may be detected by a proximity switch or a photoelectric switch 251.

Figure 16:
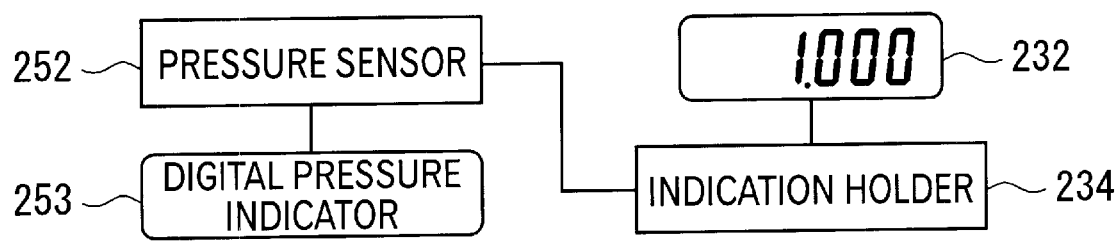
FIG. 16 is an illustration showing another modification of the ninth embodiment.

Alternatively, as shown in FIG. 16, a pressure sensor 252 for detecting the force applied to the anvil may be provided as a measuring force detector for detecting the measuring force for the spindle to press the workpiece and, when the measuring force detected by the pressure sensor 252 reaches a predetermined measuring force set in advance, the indicated value on the digital display 232 may be held by the indication holder 234. In this case, a pressure indicator 253 for displaying the measuring force detected by the pressure sensor 252 may be provided.

Figure 17:
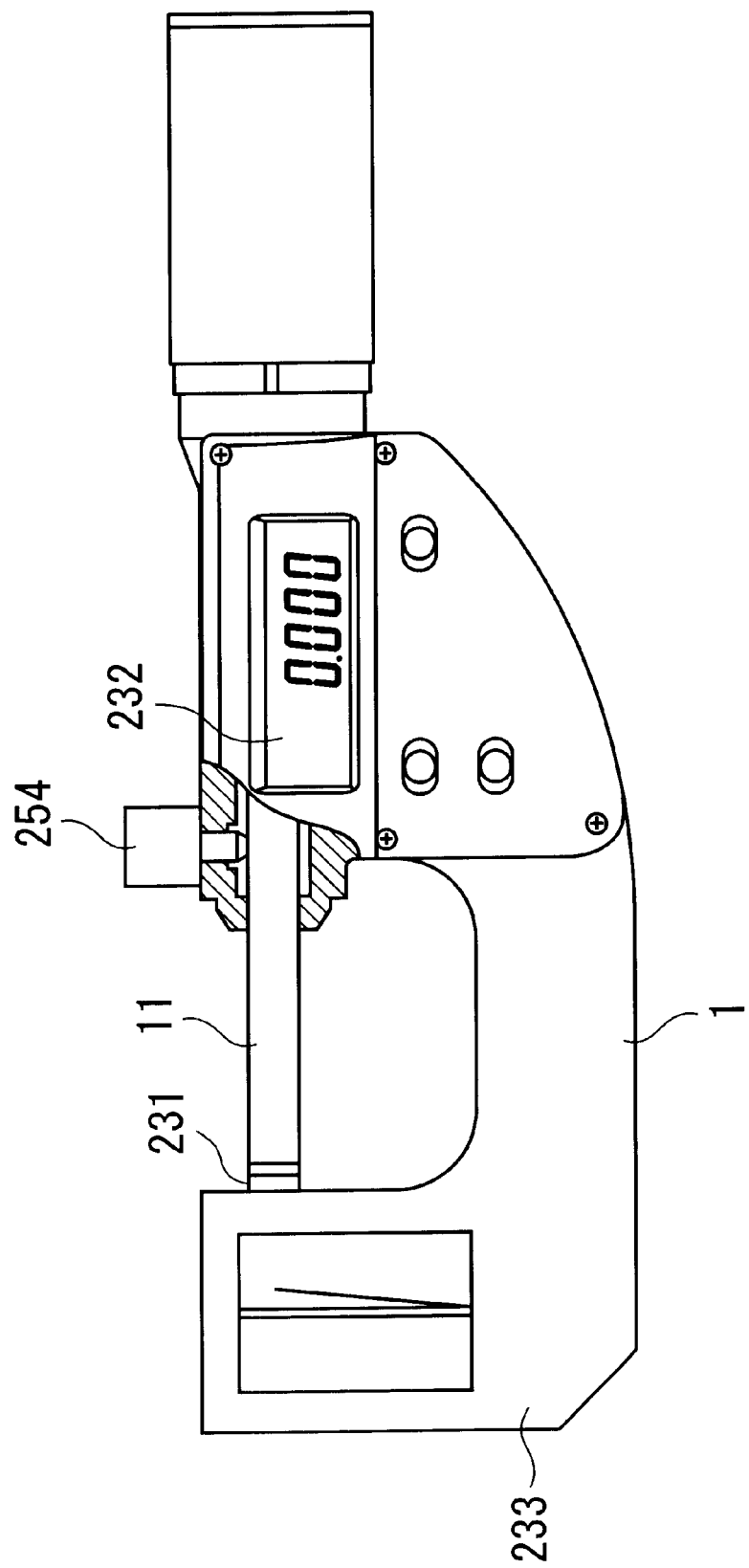
FIG. 17 is an illustration showing further modification of the ninth embodiment.

Further alternatively, as shown in FIG. 17, a spindle fixing device 254 for restricting the movement of the spindle 11 may be provided to the body 1, so that the measuring force is detected while actuating the spindle fixing device 254 with a hold command, i.e. while restricting the movement of the spindle 11.

[Modifications]

Though the sleeve 31 is moved in the axial direction by the rotation of the thimble 21 in the above embodiments, the sleeve may be manually moved, or may be driven by a release, lever, rack and pinion, motor, etc.

Though one end of the connector 41 is fixed to the spindle 11 and the other end is movably connected to the sleeve 31 by a predetermined stroke, both ends of the connector 41 may be movably connected to the spindle 11 and the sleeve 31 respectively by a predetermined stroke.

What is claimed is:

1. A measuring instrument, comprising:

a body;

a spindle provided to the body movably in an axial direction thereof, the spindle being moved in the axial direction to contact to a workpiece for measuring the dimension of the workpiece based on a moving position of the spindle;

a sleeve provided to the body movable in the same direction as the moving direction of the spindle and stoppable at a desired position;

a connector for connecting the sleeve and the spindle and allowing a relative movement of the sleeve and the spindle by a predetermined stroke in the moving direction;

a biaser accommodated in the sleeve for biasing the spindle through the connector in a direction to abut to the workpiece; and a biasing force indicator for indicating a biasing force of the biaser.

2. The measuring instrument according to claim 1, wherein a biasing force adjuster for adjusting the biasing force of the biaser is screwed to the sleeve.

3. The measuring instrument according to claim 2, the biasing force indicator further comprising: a scale rod provided to the connector penetrating the biasing force adjuster; and a scale formed along a longitudinal direction of the scale rod at a predetermined interval.

4. The measuring instrument according to claim 2, the biasing force indicator comprising: a threaded shaft provided to the connector penetrating the biasing force adjuster and having an external thread on an outer circumference thereof; a nut screwed to the threaded shaft and provided to the sleeve rotatable and immovable in the axial direction; and an index fixed to the nut.

5. The measuring instrument according to claim 2, further comprising a preload indicator for indicating a preload of the biaser adjusted by screwing the biasing force adjuster.

6. The measuring instrument according to claim 5, the preload indicator comprising a scale provided on the outer circumference of the biasing force adjuster along the axial direction.

7. The measuring instrument according to claim 6, the preload indicator comprising: a display cylinder provided on an outer circumference of the biasing force adjuster in a manner capable of adjusting rotation and position thereof along the axial direction; and a scale provided on the outer circumference of the display cylinder along the axial direction.

8. The measuring instrument according to claim 6, wherein a cover for covering the biasing force adjuster is detachably provided to the body.

9. The measuring instrument according to claim 8, the cover comprising a window for exposing the scale.

10. The measuring instrument according to claim 1, the biasing force indicator comprising: a detection switch for detecting that the spindle and the sleeve approach with each other by a predetermined distance; and a display for displaying an actuation of the detection switch.

11. The measuring instrument according to claim 10, further comprising a position detection indicator for detecting the moving position of the spindle as an electric signal and for digitally displaying the moving position of the spindle based on the detected result, wherein an indicated value of the position detection indicator is held when the detection switch is actuated.

12. The measuring instrument according to claim 1, the biasing force indicator comprising: a force sensor provided between the connector and the biaser; and a measuring force indicator for displaying a magnitude of a force detected by the force sensor.

13. The measuring instrument according to claim 1, wherein the sleeve is provided to the body in a manner unrotatable and movable in the axial direction and is screwed to a thimble rotatably provided at a predetermined position of the body.

14. The measuring instrument according to claim 1, wherein an anvil opposing to the spindle for holding the workpiece against the spindle is provided to the body, and wherein a holder for holding the workpiece against the anvil on both sides of the anvil sandwiching an axis line of the spindle is rotatably provided on the anvil side of the body.

15. A measuring instrument, comprising:

a body;

a spindle provided to the body movably in an axial direction thereof, the spindle being moved in the axial direction to contact to a workpiece for measuring the dimension of the workpiece based on a moving position of the spindle;

a digital display for digitally displaying the moving position of the spindle;

a measuring force detector for detecting a measuring force for the spindle to press the workpiece; and an indication holder for holding a value indicated on the digital display when the measuring force detected by the measuring force detector reaches a predetermined value.

16. The measuring instrument according to claim 15, the measuring force detector comprising: an index rotatably provided to the body; a movement converting mechanism for converting a measuring force for the spindle to press the workpiece into a rotary motion of the index; and a detection switch for detecting a predetermined amount of displacement of a part of the movement converting mechanism or the index to transmit a hold command to the indication holder.

* * * * *